United States Patent
Kruska et al.

(10) Patent No.: US 10,755,838 B2
(45) Date of Patent: Aug. 25, 2020

(54) TENSIONING DEVICE FOR A SURGE ARRESTER, PRODUCTION METHOD AND SURGE ARRESTER

(71) Applicant: SIEMENS AKTIENGESELLSCHAFT, Munich (DE)

(72) Inventors: Bernd Kruska, Berlin (DE); Dirk Springborn, Berlin (DE); Kai Steinfeld, Heidenheim (DE)

(73) Assignee: Siemens Aktiengesellschaft, Munich (DE)

( * ) Notice: Subject to any disclaimer, the term of this patent is extended or adjusted under 35 U.S.C. 154(b) by 276 days.

(21) Appl. No.: 15/716,618

(22) Filed: Sep. 27, 2017

(65) Prior Publication Data

US 2018/0090246 A1 Mar. 29, 2018

(30) Foreign Application Priority Data

Sep. 27, 2016 (DE) .................. 10 2016 218 533

(51) Int. Cl.
| | | |
|---|---|---|
| *H01C 1/022* | (2006.01) |
| *H02G 13/00* | (2006.01) |
| *H01C 7/12* | (2006.01) |
| *H02G 15/064* | (2006.01) |
| *H01H 83/10* | (2006.01) |
| *H01C 7/10* | (2006.01) |
| *H02H 9/06* | (2006.01) |
| *H01C 8/04* | (2006.01) |

(52) U.S. Cl.
CPC ............... *H01C 1/022* (2013.01); *H01C 7/12* (2013.01); *H02G 13/80* (2013.01); *H01C 7/10* (2013.01); *H01C 7/123* (2013.01); *H01C 8/04* (2013.01); *H01H 83/10* (2013.01); *H02G 15/064* (2013.01); *H02H 9/06* (2013.01)

(58) Field of Classification Search
USPC .................................................. 361/117–120
See application file for complete search history.

(56) References Cited

U.S. PATENT DOCUMENTS

| | | | |
|---|---|---|---|
| 3,534,989 A | 10/1970 | Yonkers | |
| 3,739,457 A | 6/1973 | Davis | |
| 4,989,115 A * | 1/1991 | Bourdages | ............... H01C 7/12 338/21 |

(Continued)

FOREIGN PATENT DOCUMENTS

| | | |
|---|---|---|
| DE | 2028875 A1 | 12/1970 |
| DE | 3045007 A1 | 9/1981 |

(Continued)

*Primary Examiner* — Danny Nguyen
(74) *Attorney, Agent, or Firm* — Laurence Greenberg; Werner Stemer; Ralph Locher (57) ABSTRACT

A tensioning device is provided for a surge arrester having an end fitting and tensioner. The tensioning device has an axial clearance for receiving a tensioner and a region being conically tapered in axial direction to be introduced into a clearance of the end fitting being shaped for a substantially exact fit. The conically tapered region has delimitation walls defining the axial clearance for the tensioner being movable toward a clearance interior. An antifriction layer is applied to the surface of the conically tapered region. A production method for a surge arrester and a corresponding surge arrester are also provided.

16 Claims, 4 Drawing Sheets

(56) References Cited

U.S. PATENT DOCUMENTS

| | | | |
|---|---|---|---|
| 5,450,657 A | 9/1995 | Georgopoulos et al. | |
| 6,777,614 B1 | 8/2004 | Suenwoldt | |
| 8,375,552 B2 * | 2/2013 | Normoyle | H01C 7/126 29/505 |
| 8,446,703 B2 * | 5/2013 | Klaube | H01C 7/12 361/117 |
| 2005/0208829 A1 | 9/2005 | Campbell | |
| 2007/0253136 A1 * | 11/2007 | Groth | H01T 1/14 361/127 |
| 2012/0326433 A1 * | 12/2012 | Rorabaugh | B64D 37/32 285/47 |
| 2013/0279059 A1 | 10/2013 | Anjiki et al. | |

FOREIGN PATENT DOCUMENTS

| | | |
|---|---|---|
| DE | 19940939 C1 | 7/2001 |
| DE | 102009007067 A1 | 8/2010 |
| EP | 0629792 A2 | 12/1994 |
| FR | 2052848 A5 | 4/1971 |
| GB | 482984 A | 4/1938 |
| JP | 2014022632 A | 2/2014 |

\* cited by examiner

TENSIONING DEVICE FOR A SURGE ARRESTER, PRODUCTION METHOD AND SURGE ARRESTER

CROSS-REFERENCE TO RELATED APPLICATION

This application claims the benefit, under 35 U.S.C. § 119, of German Patent Application DE 10 2016 218 533.0, filed Sep. 27, 2016; the prior application is herewith incorporated by reference in its entirety.

BACKGROUND OF THE INVENTION

Field of the Invention

The invention relates to a tensioning device for a surge arrester, a production method and a surge arrester.

Surge arresters, for example in the high-voltage and medium-voltage sector, serve for dissipating impermissible surges to the ground in the case of a fault. For example, in the case of a lightning strike hitting an overhead line, discharging of the current into the ground can be performed by using a surge arrester, in such a way that electrical operating devices such as, for example, a transformer, that are connected to the overhead line are protected against damage by surges.

A surge arrester having a discharge column formed of a plurality of disk-shaped metal-oxide semiconductor resistors is known from German Patent DE 199 40 939 C1, corresponding to U.S. Pat. No. 6,777,614. The metal-oxide resistors in the case of a voltage being applied to the surge arrester below a threshold voltage that is consequential to the construction have an extremely high electrical resistance so that only a minor leakage current flows during normal operation. However, the threshold voltage is exceeded in the case of a fault, upon which the electrical resistance of the resistors is severely reduced in such a way that a high current is discharged to the ground, and the surge voltage is consequently reduced. The surge arrester has two end fittings between which the individual disk-shaped metal-oxide semiconductor resistors are compressed so as to form the discharge column. That is performed by plastic rods which are disposed externally on the discharge column and form a cage around the discharge column. In order for the rods to be secured in the end fittings, tensioning sleeves which are integrally configured and are conically shaped, that is to say are substantially in the shape of a truncated cone, are employed.

Furthermore, each tensioning sleeve toward the conically tapered end is provided with slots in such a way that the tensioning sleeve upon being placed onto a rod can be secured in a pilot bore that is provided therefor on the end fitting. To that end, each end fitting has one clearance that is shaped so as to be complementary to the conical shape of the tensioning sleeve. The rod having the tensioning sleeve is inserted into that clearance.

In order for the functioning of the tensioning mechanism to be guaranteed, the conical tensioning sleeves must be able to slide easily in the bores that are an exact fit for the tensioning sleeves, even in the case of great contact forces. However, even in the case of fairly smooth surfaces the tensioning sleeves can stick in the end fittings, often even in a non-releasable manner, when the rods are being secured. That has the consequence that the rods, when being stretched, can slide out of the tensioning sleeves and that no sufficient tensioning of the discharge column is achieved. In that case, the arrester has to be disassembled again and be reconstructed using new end fittings and tensioning sleeves.

To date, the question as to whether or not the rods are correctly secured in the end fittings has been checked in two ways. On one hand, a screwdriver is used to lightly tap on all rods. If the sound created therein is identical in the case of all rods, sufficient tensioning is assumed. On the other hand, the positions of all rods prior to stretching are marked. If a marking is no longer visible after stretching, the rod has slid into the tensioning sleeve, that is to say that that rod does not sit in a fixed manner.

Another approach is known from German Patent Application DE 10 2009 007 067 A1. No tensioning sleeves are employed, but the rods are placed into conically molded clearances in the end fitting and split by using a wedge in such a way that the rods are secured so as not to slide. Excessively deep splitting of the rods is prevented in each case by way of an expansion delimiting element which is placed around the rod in an annular manner.

SUMMARY OF THE INVENTION

It is accordingly an object of the invention to provide a tensioning device for a surge arrester, a production method and a surge arrester, which overcome the hereinafore-mentioned disadvantages of the heretofore-known devices and methods of this general type, which proceeds from known approaches to tensioning rods for surge arresters in the manner of a cage construction and which provides a tensioning device which is particularly easy to assemble.

With the foregoing and other objects in view there is provided, in accordance with the invention, a tensioning device for a surge arrester having an end fitting and a tensioner. The tensioning device includes an axial clearance for receiving a tensioner, and a region that tapers in a conical manner in axial direction for introduction into a clearance of the end fitting that is shaped so as to be a substantially exact fit. Delimitation walls of the clearance for the tensioner in the conical region are movable toward the clearance interior, and an antifriction layer is applied to the surface of the conical region.

A tensioning device in the context of the invention is a sleeve for tensioning a tensioner such as, for example, a rod in an end fitting. Aluminum, for example, can be used as a material for the tensioning device. Since the arresters can be correctly tensioned, and disassembling of the arresters in the case of the tensioning sleeves potentially not having slid into the fitting in an orderly manner is dispensed with, this results in the substantial advantage of scrap being avoided in the production of arresters. This saves costs in the production and offers a great competitive advantage.

In one preferred embodiment of the tensioning device according to the invention, the antifriction layer at least in portions includes Teflon® as a material. This is an advantage because it has been proven in extensive test series that Teflon® is particularly well suitable for the antifriction layer. Teflon® is very slippery on one hand and a very thin layer is sufficient for the sliding effect on the other hand. This facilitates the tensioning device being secured in a form-locking manner in the end fitting.

In the context of the invention, Teflon® is a plastic which at least in portions is composed of polytetrafluoroethylene.

In one further preferred embodiment of the tensioning device according to the invention, the antifriction layer is configured by wrapping the conical region with a Teflon® tape. This is an advantage, because a prefabricated tape of Teflon® or having a Teflon® coating can be easily applied to the tensioning device by a machine or by a technician.

In another preferred embodiment of the tensioning device according to the invention, the antifriction layer at least in portions includes an oil material. This is an advantage because the oil can be applied in a cost-effective and simple manner. However, it is important in this case that oil is to be applied only externally to the tensioning sleeve and under no circumstances in the clearance for the tensioner, since oil in the clearance could lead to the tensioner slipping out of the tensioning device when the discharge column is being installed. Furthermore, surge arresters are often provided with a cast external silicone liner for external isolation. To this end, a positive adhesion of the silicone to the arresters is required. The oil would counteract any positive adhesion, and must therefore be limited on the internal sides of the clearances of the end fittings.

In one further preferred embodiment of the tensioning device according to the invention, the antifriction layer includes a lacquer material. This is an advantage because a lacquer can be applied in a simple and cost-effective manner, and in comparison to oil constitutes a lower risk of glazing in regions that are not envisaged to this end. It is also important herein that the lacquer in the case of an application by machine can indeed easily be applied over the entire face (for example by dipping the sleeve into the lacquer), but that the lacquer is only to be applied to the sleeve externally. In order for a higher accuracy to be achieved, the lacquer could indeed be applied manually with a brush. However, due to the large number of tensioning devices being used, that would be very expensive to implement.

In another preferred embodiment of the tensioning device according to the invention, the antifriction layer at least in portions includes a material that differs from the material of an end fitting. Both the end fittings as well as the tensioning devices are typically made from aluminum, because aluminum is suitable for die casting, has a low specific weight, and does not corrode. The use of aluminum also has the additional benefit that the soft aluminum somewhat reduces the notching effect on the rod when the tensioning sleeve is compressed, and thus prevents weakening of the material. However, if another material is used for the surface of the tensioning device than for the end fitting, the sliding effect is improved because dissimilar materials typically have less mutual friction than identical materials and "seizing" of the tensioning device in the end fitting is avoided. One material in this case can be aluminum, for example, and another material can be stainless steel.

In one further preferred embodiment of the tensioning device according to the invention, the tensioning device is integrally configured, and the conical region has at least one slot which runs from an external face of the conical region up to the axial clearance for receiving a tensioner, wherein the at least one slot is constructed in such a manner that the delimitation walls are movable in a radially resilient manner. This is an advantage, because the tensioning device can be pushed onto the tensioner in a form-locking manner due to the radial mobility and therefore secured.

In one further preferred embodiment of the tensioning device according to the invention, the tensioning device is configured in multiple parts. In the case of integral tensioning sleeves, only the slotted end is readily deformable. The other end is rather rigid and can be deformed only by way of a comparatively high effort in terms of force. For that reason, slipping into the correct position in a clearance of an end fitting is impeded. If a multiple-part tensioning device or tensioning sleeve, respectively, is employed, the latter can thus be constructed in such a way that a deformation is possible across the entire length by way of a comparatively minor effort in terms of force. This enables particularly simple tensioning in an end fitting, because slipping into the correct position in a clearance of an end fitting is performed in a free-moving and reliable manner.

In one further preferred embodiment of the tensioning device according to the invention, the parts are configured substantially as cone segments which in the assembled state in the conical region form the axial clearance for receiving a tensioner and at least one slot. The at least one slot runs from the external face of the conical region up to the axial clearance for receiving a tensioner, and the at least one slot is constructed in such a manner that the delimitation walls are movable in a radially resilient manner. Two or more parts can be used in this case. Three parts which are grouped in a rotationally symmetrical manner about the longitudinal axis of the tensioning device and thus in each case form slots having an angular spacing of approximately 120° are typically used.

In one further preferred embodiment of the tensioning device according to the invention, each of the cone segments on that end thereof that faces away from the conically tapered region has in each case at least one first fastener for connecting to an adjacent cone segment. This facilitates the insertion into the end fitting.

In one further preferred embodiment of the tensioning device according to the invention, the first fastener is in each case configured as a protrusion. A protrusion in the context of the invention can be a peg or a pin, for example, or else a semicircular collar about the axial clearance.

In one further preferred embodiment of the tensioning device according to the invention, one second fastener which is configured as a clearance for receiving a first fastener is provided for each of the cone segments.

In one further preferred embodiment of the tensioning device according to the invention, the cone segments are shaped in such a manner that the tensioning device in the assembled state has at least one slot which encircles the axial clearance for receiving a tensioner in the manner of a helix in such a way that a notching effect on the tensioner is reduced in the case of a compression of the conical region. This is an advantage, because an intense indentation of a tensioning sleeve along the longitudinal axis of a tensioner can cause structural damage to the tensioner. This can arise in particular when glass fiber reinforced plastic rods (GRP rods) are employed as tensioners. The fibers of such glass fiber reinforced plastic rods are split open by severe notching in the compression of the sleeve. The tensioning device is thus shaped in such a way that the centerline thereof does not precisely follow the centerline of the GRP rods. This slight twisting of the parts or cone segments, respectively, causes the notching effect on the rod to not be aligned precisely in the direction of the glass fibers in the rod. The notching effect is reduced in this way.

In one further preferred embodiment of the tensioning device according to the invention, three parts which in relation to the axial clearance for receiving a tensioner form substantially angularly symmetrical cone segments are provided. This is an advantage, because a multiple-part tensioning device according to the invention can be assembled in a particularly simple manner in this way.

Proceeding from known approaches to tensioning rods for surge arresters having a cage construction, the object of the invention is furthermore based on specifying a production method by way of which a surge arrester is particularly easy to assemble.

With the objects of the invention in view, there is also provided a production method for a surge arrester, in which a plurality of tensioning devices according to the invention are prepared in that a holding device is introduced into the axial clearance for receiving a tensioner, and subsequently a Teflon® tape is wrapped around at least the conical region of the respective tensioning device, and the holding device is in each case removed from the prepared tensioning device, and in each case one tensioner is placed into the prepared tensioning devices, and the tensioning devices conjointly with the tensioner are placed into clearances of an exact fit of an end fitting, and the tensioner by using the tensioning devices are secured in the end fitting by traction or tension in such a way that a discharge column having semiconductor resistors is secured in a compressed manner between two end fittings by using a cage of rods.

The same advantages as have been explained at the outset in the context of the tensioning device according to the invention are derived.

Proceeding from known approaches to tensioning rods for surge arresters having a cage construction, the invention is furthermore based on the object of specifying a surge arrester which is particularly easy to assemble.

With the objects of the invention in view, there is furthermore provided a surge arrester having a discharge column which has a plurality of metal-oxide resistors, and two end fittings between which the discharge column is secured by using a plurality of tensioners, wherein each tensioner is in each case fastened to one of the end fittings by way of a tensioning device according to the invention.

In an analogous manner, the same advantages as have been explained at the outset in the context of the tensioning device according to the invention are derived.

In one preferred embodiment of the surge arrester according to the invention, the antifriction layer is configured by incorporating Teflon® in the clearance of the end fitting that is shaped so as to be of a substantially exact fit. Coating the internal face of the clearances with Teflon® can be performed, for example.

In another preferred embodiment of the surge arrester according to the invention, the tensioner is a rod.

In one further preferred embodiment of the surge arrester according to the invention, the rod at least in portions is composed of a glass fiber reinforced plastic.

Other features which are considered as characteristic for the invention are set forth in the appended claims.

Although the invention is illustrated and described herein as embodied in a tensioning device for a surge arrester, a production method and a surge arrester, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
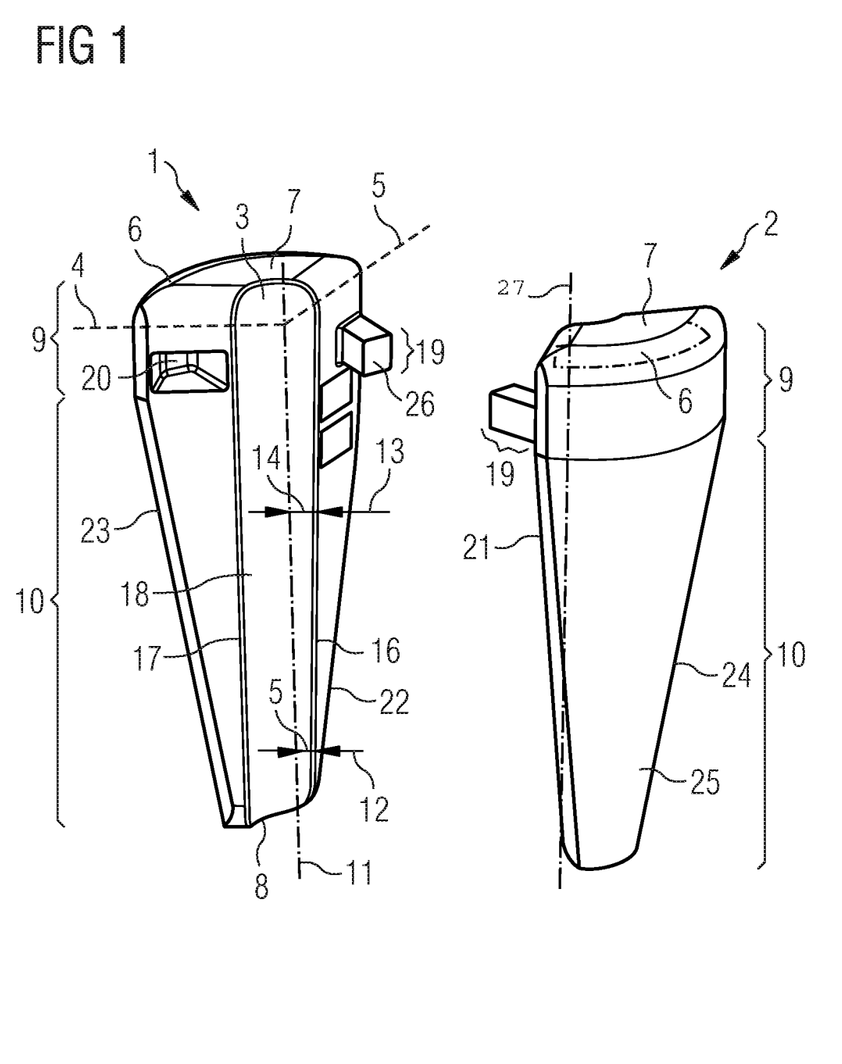
FIG. 1 is a diagrammatic, exploded, perspective view of two parts of a three-part tensioning device according to a first exemplary embodiment of the invention.

Referring now to the figures of the drawings in detail and first, particularly, to FIG. 1 thereof, there are seen two parts 1, 2 of a three-part tensioning device according to a first exemplary embodiment of the invention. Both parts 1, 2 are configured substantially as truncated cone segments. The first segment 1 in the left part of the illustration is shaped in such a manner that a first region 9 which has substantially the shape of a cylinder with a correspondingly non-bulging external edge is configured at one end of the segment 1. The external edge runs so as to be parallel with a longitudinal axis 11, for example.

The first region 9 is furthermore shaped in such a manner that the segment 1 forms an axial clearance 3 having an angle of 120° in a plan view between axes 4 and 5. In this way, three combined cone segments form one complete cylindrical first region 9 for the one completely preassembled tensioning device. An end 7 at the end of the first region 9 is configured as a flat surface having edges 6 that are rounded toward the lateral faces.

A second region 10 which opens into a second end 8 adjoins the first region 9. A tensioning sleeve, or the present cone segment 1, respectively, is conically shaped in this region 10, that is to say external edges 21, 22, 23, 24 taper inwardly in the manner of a truncated cone in such a way that a wedge shape is formed in cross section.

The axial clearance 3 is provided along the longitudinal axis 11 both in the first region 9 as well as in the second region 10 for receiving a tensioner. This axial clearance 3 is structured in such a manner that in the assembled state of three cone segments a substantially cylindrical cavity is provided for receiving a glass fiber reinforced plastic rod as a tensioner.

The axial clearance 3 in the cone segment 1 is laterally delimited by cut edges or delimiting walls 17 and 16 defining a clearance interior 18. Furthermore, the axial clearance 3 is structured in such a way that the latter in the assembled state of the cone segments has a contact pressure face that encircles the installed rod in a slightly helical manner. In other words, the three slots that are configured between the three segments run around the glass fiber rod in a slightly helical manner, and due to this construction cause a reduced notching effect. Due to this effect, notching and thus structural weakening along the glass fibers of the rod are reduced, and stability is thus enhanced. This slightly asymmetric embodiment of the axial clearance 3 can be identified in FIG. 1 by way of auxiliary axes 12, 13. The auxiliary axes 12, 13 intersect the longitudinal axis 11 and form a spacing 5 in the region of the auxiliary axis 12 and a spacing 14 in the region of the auxiliary axis 13, in which the spacing 14 is substantially larger than the spacing 5.

The first region 9 has a first fastener 19. The first fastener 19 is configured as a type of peg or pin contact, having a square footprint and an end region 26 which is inclined in a wedge-shaped manner. The first fastener 19 is provided for introduction into a clearance that is provided therefor in the cone segment 2.

Figure 2:
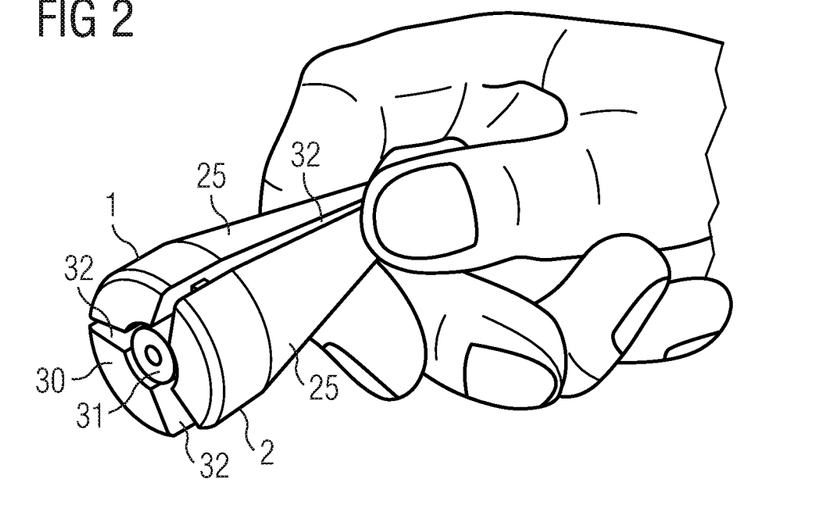
FIG. 2 is a perspective view of an assembled tensioning device having three parts.

The cone segment 2 in the first region 9 also has a first fastener 19 which is provided for introduction into a second fastener 20 of the third cone segment 30 that is illustrated in FIG. 2. A second fastener 20 is shown in the first cone segment 1. The second fastener 20 has a clearance shaped so that the pin 19 of a corresponding cone segment can be inserted in a free moving manner in such a way that mutual slipping of the cone segments in the longitudinal direction is prevented.

The second cone segment 2 has an axial clearance along a longitudinal axis 27, so that the helical twisting of the external edge or lateral line 21 and of the external edge or lateral line 24 of a conically bulging external region 25 can be seen.

FIG. 2 shows an assembled tensioning device having three parts 1, 2, 30. The parts 1, 2, 30 are configured substantially as cone segments which are secured against slipping in the longitudinal direction due to the mutual engagement of the non-illustrated first and second fasteners 19, 20. The three parts form the axial clearance 3 for receiving a tensioner, however a holding device 31, in the form of a round metal rod, instead of the tensioner, is introduced into the clearance as an assembly aid. Due to the presence of the holding device 31, the three segments 1, 2, 30 come to lie in such a manner that three slots 32 are formed therebetween. The conically tapered external face 25 can furthermore be readily seen.

Figure 3:
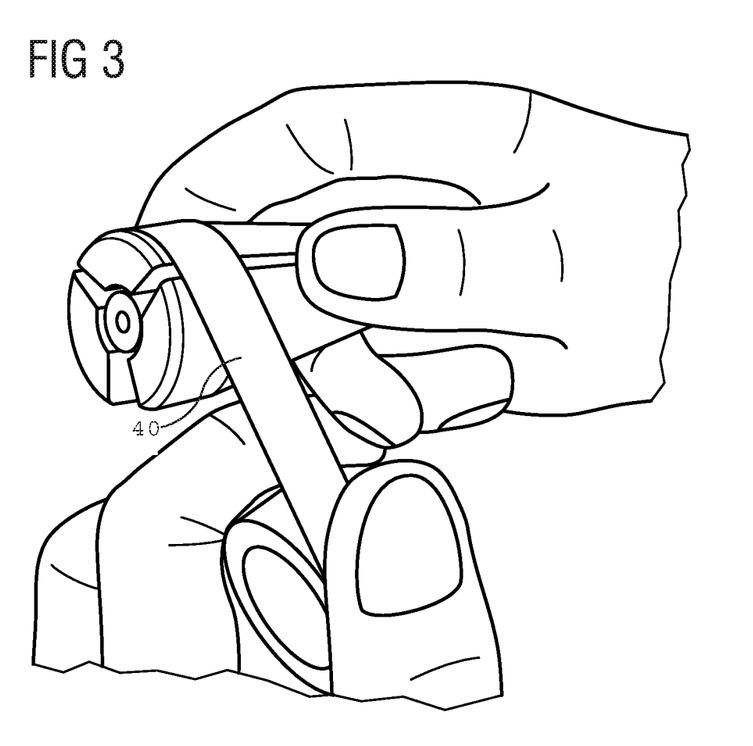
FIG. 3 is a perspective view of the tensioning device according to FIG. 2 when being wrapped with a Teflon® tape.

FIG. 3 shows the tensioning device according to FIG. 2, which is wrapped on the external face 25 with a Teflon® tape 40 for the preparation of an arrester assembly. The Teflon® tape 40 provides a thin antifriction layer on the tensioning device by wrapping the first and second regions 9, 10.

Figure 4:
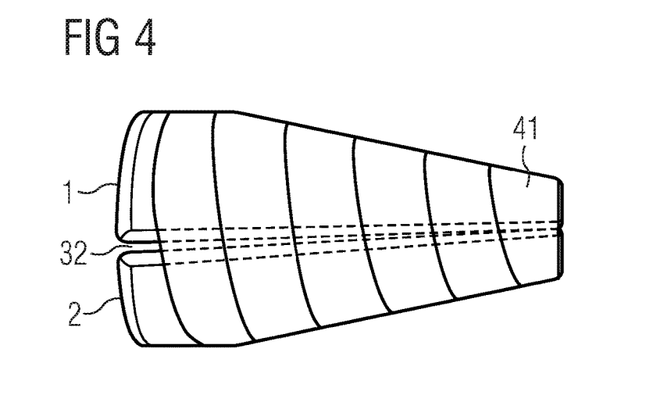
FIG. 4 is a side-elevational view of the tensioning device according to FIG. 3, having an antifriction layer made from a Teflon® tape.

FIG. 4 shows a prepared tensioning device having the segments 1, 2. A complete antifriction layer 41 is provided by the Teflon® tape. The antifriction layer 41 also spans the gap 32 between the segments 1, 2. If the assembly aid 31 is now removed, this prepared tensioning sleeve, or tensioning device, respectively, can be push-fitted as a tensioner onto a GRP rod and placed into an opening shaped to an exact fit in an end fitting.

Figure 5:
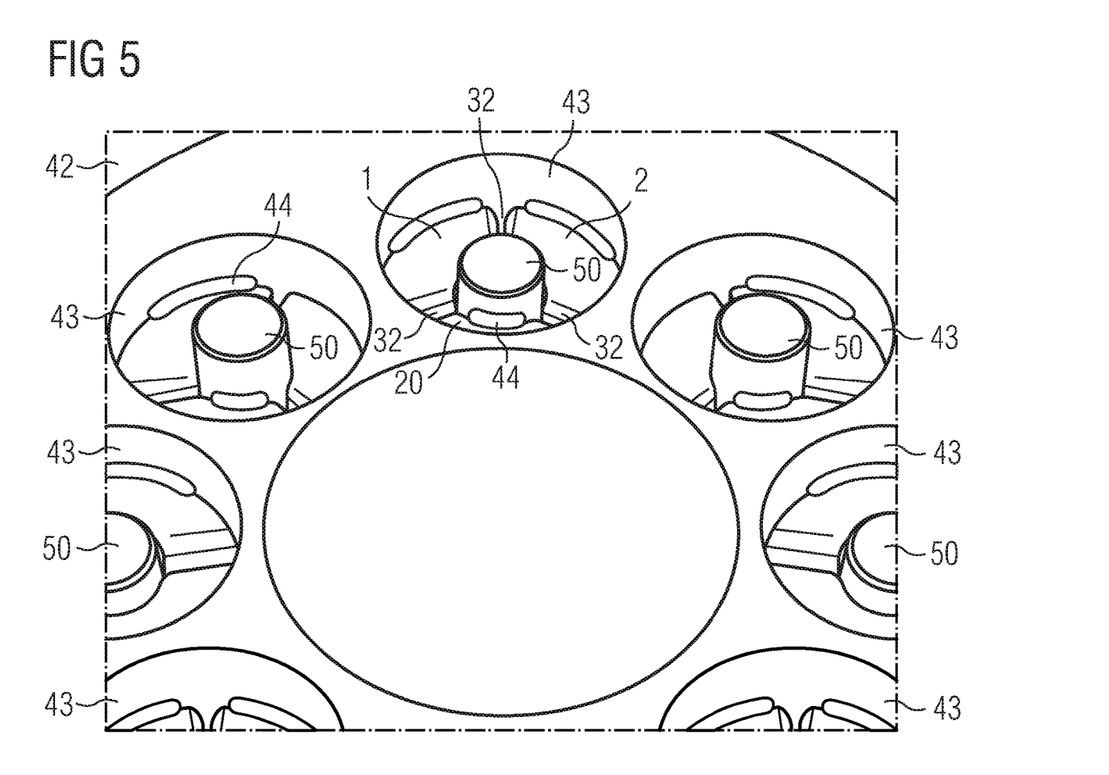
FIG. 5 is a perspective view from above of an end fitting in which a plurality of tensioner are secured by tensioning devices.

FIG. 5 shows a perspective plan view of an end fitting 42 in which a plurality of tensioners 50 are secured by using tensioning devices. To this end, the end fitting has pilot bores 43 into which the tensioning devices 1, 2, 30 are placed. A respective marking 44 has been provided by a black line on tensioners or rods 50. Furthermore, the position of the individual segments 1, 2, 30 of the tensioning device in the opening 43 of the end fitting is marked. The GRP rod 50 is reliably secured by compressing the conical region of the tensioning device in the end fitting that is shaped to an exact fit. Should slipping nevertheless arise, the slipping can be readily seen by using the markings.

Figure 6:
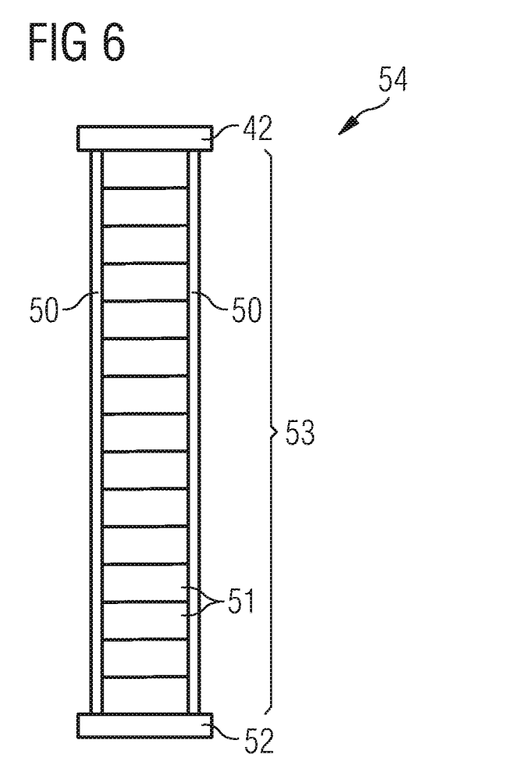
FIG. 6 is a front-elevational view of a surge arrester having a discharge column and end fittings.

FIG. 6 shows a surge arrester 54 with two end fittings 42, 52. Several semiconductor resistors 51 form a discharge column 53 which is secured in a compressed manner by the tensioning devices or rods 50.

The invention claimed is:

1. A tensioning device for a surge arrester having a tensioner and an end fitting with a clearance, the tensioning device comprising:
a region being conically tapered in axial direction, said conically tapered region having a surface being shaped for introduction into the clearance of the end fitting with a substantially exact fit;
delimiting walls forming an axial clearance having a clearance interior for receiving the tensioner, said delimiting walls in said conically tapered region being movable toward said clearance interior; and
an antifriction layer applied to said surface of said conically tapered region.

2. The tensioning device according to claim 1, wherein at least portions of said antifriction layer include polytetrafluoroethylene material.

3. The tensioning device according to claim 2, wherein said antifriction layer is formed by wrapping said conically tapered region with a polytetrafluoroethylene tape.

4. The tensioning device according to claim 1, wherein the tensioning device is integrally constructed, said conically tapered region has an external face, said conically tapered region has at least one slot running from said external face to said axial clearance for receiving the tensioner, and said delimitation walls are movable in a radially resilient manner to form said at least one slot.

5. The tensioning device according to claim 1, wherein the tensioning device has multiple parts.

6. The tensioning device according to claim 5, wherein:
said parts are substantially constructed as cone segments forming said axial clearance for receiving the tensioner and forming at least one slot in said conically tapered region in an assembled state;
said conically tapered region has an external face;
said at least one slot runs from said external face of said conically tapered region to said axial clearance for receiving the tensioner; and
said delimitation walls are movable in a radial manner to form said at least one slot.

7. The tensioning device according to claim 6, wherein each of said cone segments has an end facing away from said conically tapered region, and each of said ends has at least one respective first fastener for connecting to an adjacent cone segment.

8. The tensioning device according to claim 7, wherein each of said first fasteners is constructed as a respective protrusion.

9. The tensioning device according to claim 7, wherein each of said cone segments has a respective second fastener constructed as a clearance for receiving a respective one of said first fasteners.

10. The tensioning device according to claim 8, wherein each of said cone segments has a respective second fastener constructed as a clearance for receiving a respective one of said protrusions.

11. The tensioning device according to claim 6, wherein said cone segments in said assembled state of the tensioning device are shaped to provide said at least one slot as a helix encircling said axial clearance for receiving the tensioner to reduce a notching effect on the tensioner upon a compression of said conically tapered region.

12. The tensioning device according to claim 5, wherein said parts include three parts forming substantially angularly symmetrical cone segments in relation to said axial clearance for receiving the tensioner.

13. A production method for a surge arrester, the method comprising the following steps:
providing a plurality of tensioning devices each including a region being conically tapered in axial direction and delimiting walls, the delimiting walls forming an axial clearance for receiving a tensioner, the axial clearance having a clearance interior, and the delimiting walls being movable toward the clearance interior in the conically tapered region;

introducing a respective holding device into each respective axial clearance;

subsequently wrapping a polytetrafluoroethylene tape around at least the conically tapered region of each respective tensioning device;

removing the holding devices from the tensioning devices;

placing a respective tensioner into each respective tensioning device;

placing the tensioning devices conjointly with the tensioners into clearances in an end fitting with an exact fit; and using the tensioning devices to secure the tensioners in the end fitting by traction to permit a discharge column having semiconductor resistors to be secured in a compressed manner between two of the end fittings by using a cage of rods.

14. A surge arrester, comprising:

a discharge column having a plurality of metal-oxide resistors;

two end fittings;

a plurality of tensioners securing said discharge column between said two end fittings; and tensioning devices according to claim 1, each of said tensioning devices fastening a respective one of said tensioners to a respective one of said end fittings.

15. The surge arrester according to claim 14, wherein said tensioners are rods.

16. The surge arrester according to claim 15, wherein at least portions of said rods are composed of a glass fiber reinforced plastic.

* * * * *